US012637937B2

(12) United States Patent
Keskes

(10) Patent No.: US 12,637,937 B2
(45) Date of Patent: May 26, 2026

(54) METHOD OF AND APPARATUS FOR OPTIMIZING A DRILLING STRATEGY

(71) Applicant: TotalEnergies OneTech, Courbevoie (FR)

(72) Inventor: Noomane Keskes, Pau (FR)

(73) Assignee: TOTALENERGIES ONETECH, Courbevoie (FR)

( * ) Notice: Subject to any disclaimer, the term of this patent is extended or adjusted under 35 U.S.C. 154(b) by 273 days.

(21) Appl. No.: 18/268,974

(22) PCT Filed: Jan. 21, 2021

(86) PCT No.: PCT/EP2021/051373
§ 371 (c)(1),
(2) Date: Jun. 21, 2023

(87) PCT Pub. No.: WO2022/156898
PCT Pub. Date: Jul. 28, 2022

(65) Prior Publication Data
US 2024/0044239 A1 Feb. 8, 2024

(51) Int. Cl.
*E21B 44/00* (2006.01)
*G01V 1/30* (2006.01)

(52) U.S. Cl.
CPC .............. *E21B 44/00* (2013.01); *G01V 1/30* (2013.01); *E21B 2200/22* (2020.05)

(58) Field of Classification Search
CPC ...... G05B 13/027; G05B 17/02; G05B 13/02; E21B 44/005; E21B 21/08; E21B 47/024;
E21B 10/00; E21B 47/022; G06N 3/092; G06N 20/00; G06N 3/045; G06F 18/214; G06Q 50/02; G01V 1/40; G01V 20/00
See application file for complete search history.

(56) References Cited

U.S. PATENT DOCUMENTS 7,066,280 B2 6/2006 Sullivan et al.
7,814,036 B2 10/2010 Chen et al.
(Continued)

FOREIGN PATENT DOCUMENTS

WO WO-2015067864 A1 5/2015
WO 2019040091 A1 2/2019

OTHER PUBLICATIONS

"International Search Report"; prepared for PCT/EP2021/051373; Authorized Officer Olinka Mirkovic; Oct. 5, 2021; 3 pages.
(Continued)

*Primary Examiner* — Kidest Worku
(74) *Attorney, Agent, or Firm* — Alleman Hall LLP

(57) ABSTRACT
Disclosed is a method for optimizing a drilling strategy during drilling of a well within a subsurface volume comprising a reservoir zone. The method comprises obtaining a trained neural network, having been trained on training data relating to the subsurface volume to infer well data from seismic data and fresh well data from a portion of said well which has been drilled. The trained neural network is further trained using training data comprising said fresh well data and associated seismic data from the subsurface volume and then used to determine inversion well data relating to a region of the reservoir comprising an intended well path for the well. The drilling strategy for at least a next portion to be drilled is optimized based on said inversion well data.

20 Claims, 7 Drawing Sheets

(56)                    References Cited

U.S. PATENT DOCUMENTS

| | | | |
|---|---|---|---|
| 8,714,246 | B2 | 5/2014 | Pop et al. |
| 9,022,140 | B2 | 5/2015 | Marx et al. |
| 9,249,654 | B2 | 2/2016 | Strachan et al. |
| 9,388,680 | B2 | 7/2016 | Moran |
| 10,024,991 | B2 | 7/2018 | Keskes |
| 2006/0173625 | A1 | 8/2006 | Moran |
| 2008/0262810 | A1* | 10/2008 | Moran ...................... E21B 7/00 |
| | | | 703/10 |
| 2009/0114445 | A1* | 5/2009 | Dashevskiy ......... G01V 11/002 |
| | | | 702/9 |
| 2010/0155142 | A1* | 6/2010 | Thambynayagam ... E21B 44/00 |
| | | | 175/61 |
| 2015/0300151 | A1 | 10/2015 | Mohaghegh |
| 2016/0076357 | A1* | 3/2016 | Hbaieb ................... E21B 44/00 |
| | | | 702/9 |
| 2016/0291179 | A1* | 10/2016 | Keskes ................. G01V 1/301 |
| 2019/0025461 | A1 | 1/2019 | Czaplewski et al. |
| 2019/0170888 | A1* | 6/2019 | Halpert ................. G01V 1/306 |
| 2019/0293818 | A1* | 9/2019 | Meek .................... G01V 1/306 |

OTHER PUBLICATIONS

"Written Opinion"; prepared for PCT/EP2021/051373; Authorized
Officer Olinka Mirkovic; Oct. 5, 2021; 6 pages.
United Arab Emirates Ministry of Economy & Tourism, Office
Action Issued in Application No. P6001811/2023, Dec. 1, 30, 2025,
8 pages.

* cited by examiner

METHOD OF AND APPARATUS FOR OPTIMIZING A DRILLING STRATEGY

FIELD OF THE INVENTION

The present invention relates to the optimizing a drilling strategy and notably the field of the drilling wells for producing hydrocarbons from reservoirs.

BACKGROUND OF THE INVENTION

When conducting seismic studies, the propagation rate of the seismic wavelet emitted is an important piece of data for the precise determination of a seismic image. Generally, a high propagation rate tends to reduce the vertical resolution of the image constructed using conventional seismic imaging tools.

In particular, calculation uncertainties may be such in defined rate models that a slight error in the time domain may give rise to significant variations in the spatial domain. This problem is increased if the seismic wavelet is propagated at a high rate in the subsoil under study (in particular, if the subsoil comprises carbonates, as in some reservoirs in the Middle East).

Vertical reservoir resolution is however useful for industrial firms seeking to operate these reservoirs. This resolution particularly enables:

superior estimation of the volumes of hydrocarbons or gas present in the subsoil;

superior modelling of the reservoirs for subsequent simulations (e.g. geo-modelling);

superior monitoring of drilling operations;

etc.

To address this, a method has been described in patent application WO2015/067864 (incorporated herein by reference), which enables processing of seismic signals in an enhanced way so as to increase seismic image resolution.

It would be desirable to use such method to optimize a drilling strategy, and in particular to do so while the well is being drilled.

SUMMARY OF THE INVENTION

For this purpose, the present invention proposes to enhance the processing of seismic signals in order to extract a maximum amount of information therefrom, and notably enhance the definition of the seismic images generated.

The present invention thus relates to a method for optimizing a drilling strategy during drilling of a well within a subsurface volume comprising a reservoir zone; the method comprising: a) obtaining a trained neural network, having been trained on training data relating to the subsurface volume to infer well data from seismic data; b) obtaining fresh well data from a portion of said well which has been drilled; c) further training said trained neural network using training data comprising said fresh well data and associated seismic data from the subsurface volume; d) using the further trained neural network to determine inversion well data relating to a region of the subsurface volume comprising an intended well path for the well; and e) optimizing said drilling strategy for at least a next portion to be drilled based on said inversion well data.

A computer program, using all or part of the method described above, installed on pre-existing equipment, is advantageous per se, insofar as it makes it possible to process a seismic signal effectively.

As such, the present invention also relates to a computer program containing instructions for the use of the method described above, when this program is executed by a processor.

This program can use any programming language (for example, an object or other language), and be in the form of an interpretable source code, a partially compiled code or a fully compiled code.

Further features and advantages of the invention will emerge further on reading the following description.

BRIEF DESCRIPTION OF THE FIGURES

Embodiments of the invention will now be described, by way of example only, by reference to the accompanying drawings, in which.

DETAILED DESCRIPTION OF THE INVENTION

Figure 1:
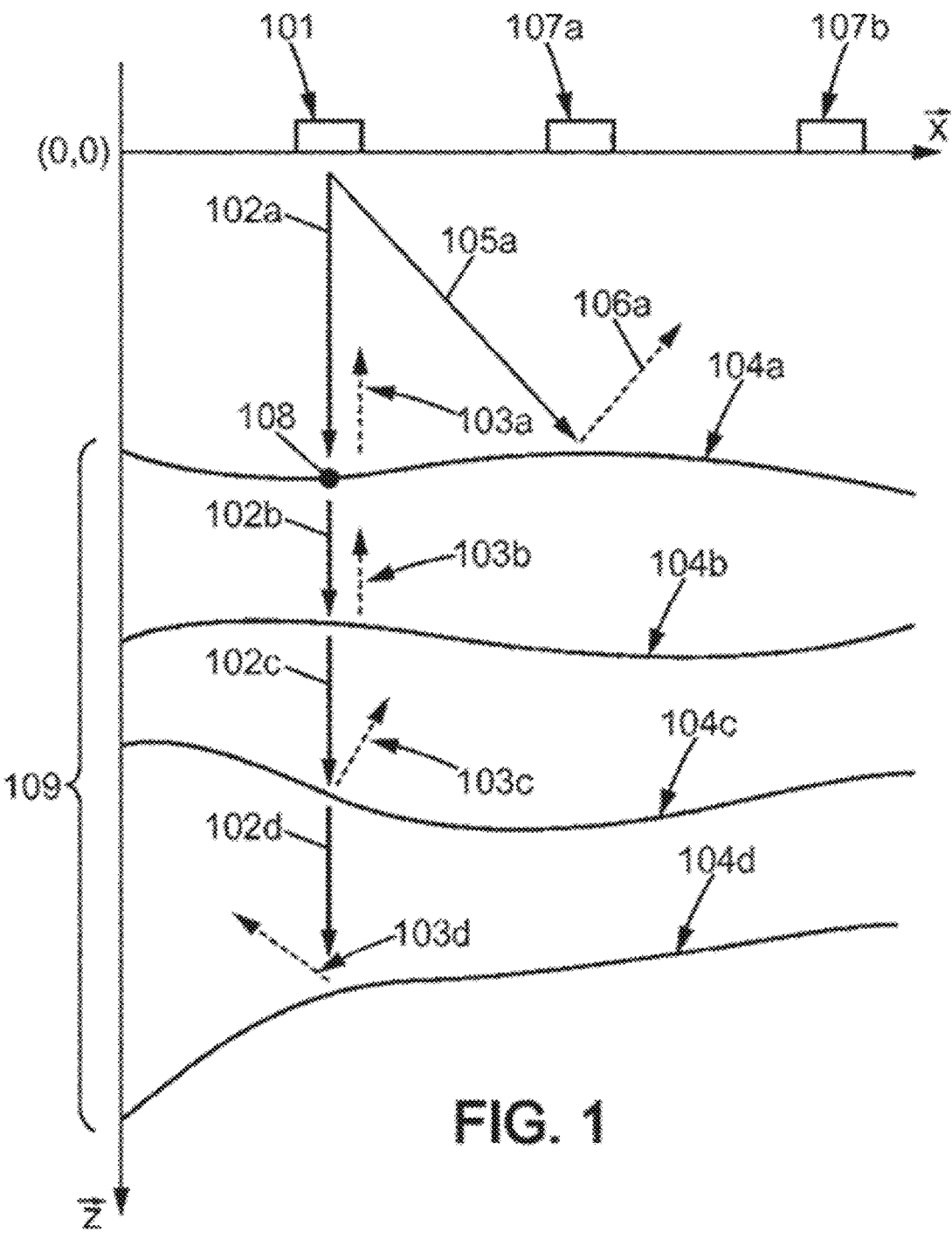
FIG. 1 illustrates an illustration of seismic reflections in a particular embodiment.

FIG. 1 illustrates an illustration of seismic reflections in a particular embodiment. Following the emission of a seismic wavelet in the subsoil, by a seismic vibrator truck 101 for example, this wavelet is propagated in the subsoil vertically (arrow 102 a, 102 b, 102 c, 102 d) but also in all spatial directions (arrow 105 a).

The term "seismic wavelet" denotes the seismic pulse or elementary wavetrains emitted by the vibration source (e.g. vibrator truck). This wavelet is reflected by the interfaces (104 a, 104 b, 104 c, 104 d) for the change of propagation index in the subsoil: the reflected wave (103 a, 103 b, 103 c, 103 d, 106 a) is propagated in a direction symmetric to the direction of incidence with respect to a normal to the interface at the incidence zone. For example, if the interface 104 a is perpendicular to the wave 102 a at the point 108, then the reflected wave 103 a will be in the same direction as the incident wave 102 a (but in the opposite direction).

In order to capture the waves reflected in varied directions, it is possible to place different geophones 107 a or 107 b at different distances (or offsets) from the seismic truck 101. As such, the reflected wave 106 a can be captured by the geophone 107 b.

There are numerous methods for determining, on the basis of the geophone records, the trajectory of the wavelets (e.g. seismic migration). These methods generally supply seismic images based on "pre-stack" signals or on "stack" signals.

During the reception of the seismic signal, a portion of the signal arriving after another portion of the signal is generally representative of a reflection located more in-depth. As such, it is possible, with the knowledge of the values of a reservoir 109 in the subsoil, to process a signal received by the different geophones so as to retrieve a filtered/processed signal therefrom, only containing information relating to the reflections occurring within this reservoir (i.e. temporal definition of the signal received).

Figures 2A, 2B:
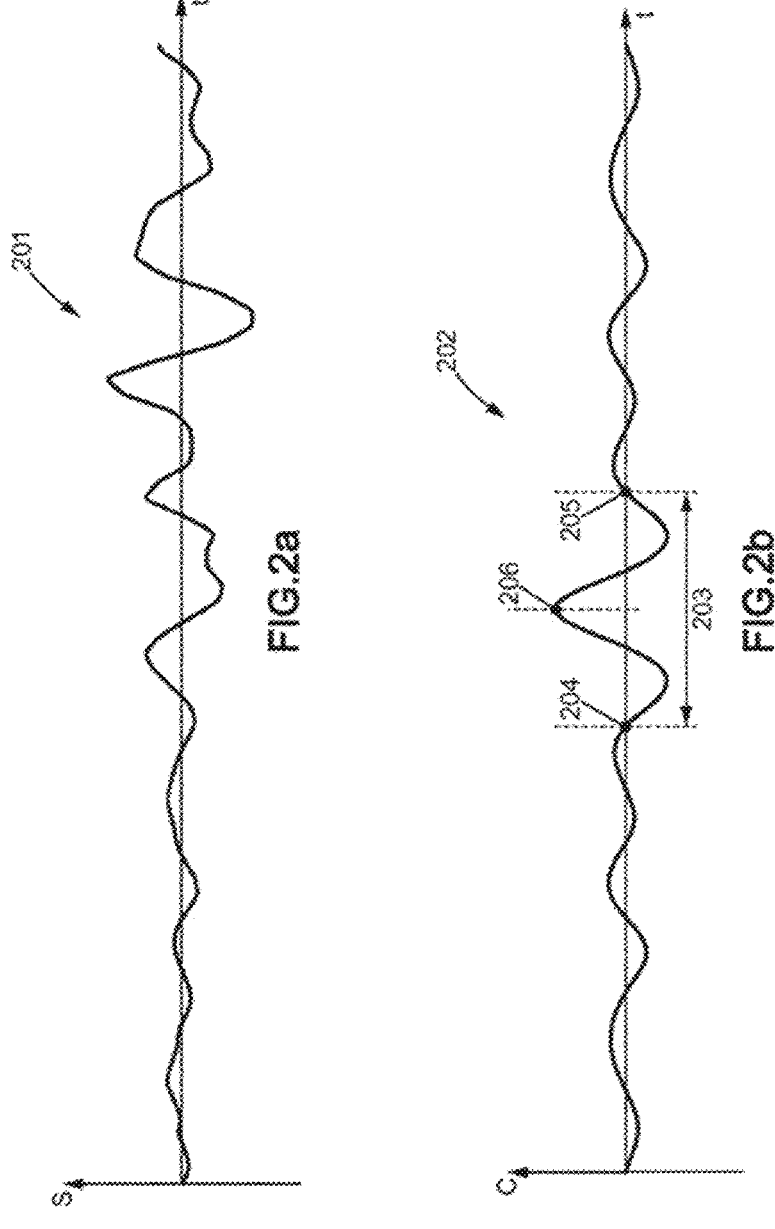
FIG. 2a illustrates an example of a seismic signal received in response to the emission of a seismic wavelet in a reservoir and in one embodiment of the invention.
FIG. 2b illustrates an example of autocorrelation of the signal in FIG. 2a in one embodiment according to the invention.

FIG. 2a illustrates an example of a seismic signal received in response to the emission of a seismic wavelet in a reservoir. The seismic signal received (optionally after temporal definition as mentioned above) can be represented by the graph 201. The axis t is herein a time axis expressed in seconds, fractions of seconds or in number of samples (the signal being in this case sampled according to a predetermined frequency). The axis S is representative, for example, of a power or an amplitude of the acoustic signal received. Obviously, it is difficult, on the basis of this signal, to determine the shape or length of the wavelet emitted. For this purpose, it is possible to carry out de-convolution of the signal received on the assumption that an interface of the subsoil can be represented by a pulse response optionally including a reflectivity model and/or an attenuation model. This method is relatively complex to implement and implies good knowledge of the temporal position of the interfaces. Furthermore, this de-convolution is generally incomplete and a signal containing high-frequency information (e.g. greater than 100 Hz) may remain. This residual signal is generally considered, by the prior art, as a noise.

FIG. 2b illustrates an example of autocorrelation of the signal in FIG. 2a. Indeed, it is possible to determine an estimation of the length of the wavelet emitted without having to compute complex de-convolutions. It is possible to compute the autocorrelation of the signal received after temporal definition thereof in a time window corresponding to the reservoir. An autocorrelation is a correlation of a signal by itself, this second signal being offset by a given time interval. The autocorrelation of the signal 201 is the curve 202. The X-axis of this curve represents the time interval between the two correlated identical signals and the Y-axis shows the correlation of these two curves for the time interval in question.

In FIG. 2b, the correlation of the two signals is sometimes high, sometimes low. The repetition (or "respiration") of this correlation thus makes it possible to determine a representative correlation distance of the length of the wavelet having generated this signal. This correlation distance 203 is the distance between the two symmetric zeros (204, 205) with respect to the maximum peak 206. If a plurality of distances are used to compute the length of the wavelet (e.g. for a plurality of seismic traces), it is possible to determine a variance of this distance in order to determine the precision of this determination.

Figure 3A:
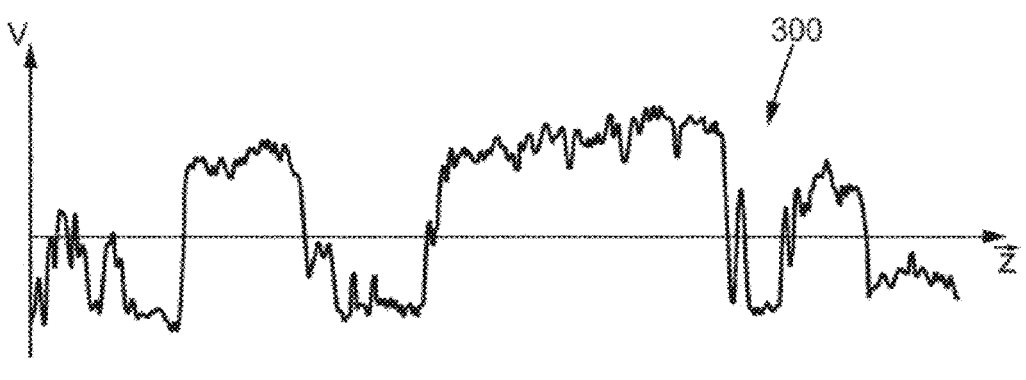
FIG. 3a illustrates an example of well data in one embodiment according to the invention.

FIG. 3a illustrates an example of well data. The term "well data" denotes geological, geophysical or other data, obtained, for example, from drill holes. They are, for example, one or a plurality of pieces of information located along the well relating to one or more of: the facies of the subsoil; rock reflectivity; rock porosity; rock resistivity; rock elasticity; rock permeability; etc. When the well data only contain a single piece of information (e.g. the reflectivity), the term "geological information" may be used. More specifically, the well data may comprise a large number of pieces of information which have been previously filtered/sorted/computed so as to only contain a single type of data (e.g. reflectivity, porosity, etc.): filtered well data are generally referred to as "geological information". However, the term well data will be used in its widest sense below to cover processed geological information also. Most of these pieces of information may be expressed in numeric form (e.g. the reflectivity expressed as a percentage, the permeability expressed in Darcy, the porosity expressed as a percentage, etc.).

The well data or geological information may comprise a piece of information from a group including a piece of porosity information, a piece of reflectivity information, a piece of density information, a piece of resistivity information and a piece of mineralogical composition information, a piece of gamma-ray log information, a piece of density information, a piece of sound propagation rate information, a piece of permeability information and a piece of saturation information. The second piece of geological information may be a piece of filtered information in a given frequency range. The given frequency range may be a single frequency. This filtering makes it possible to limit the amount of information for training the neural network.

By way of illustration, the curve 300 represents well data for a reservoir zone of the subsoil (relating to the rock reflectivity). The X-axis of this curve represents the depth of the well data item and the Y-axis represents the value thereof. These data are data containing "high-frequency" information.

Figure 3B:
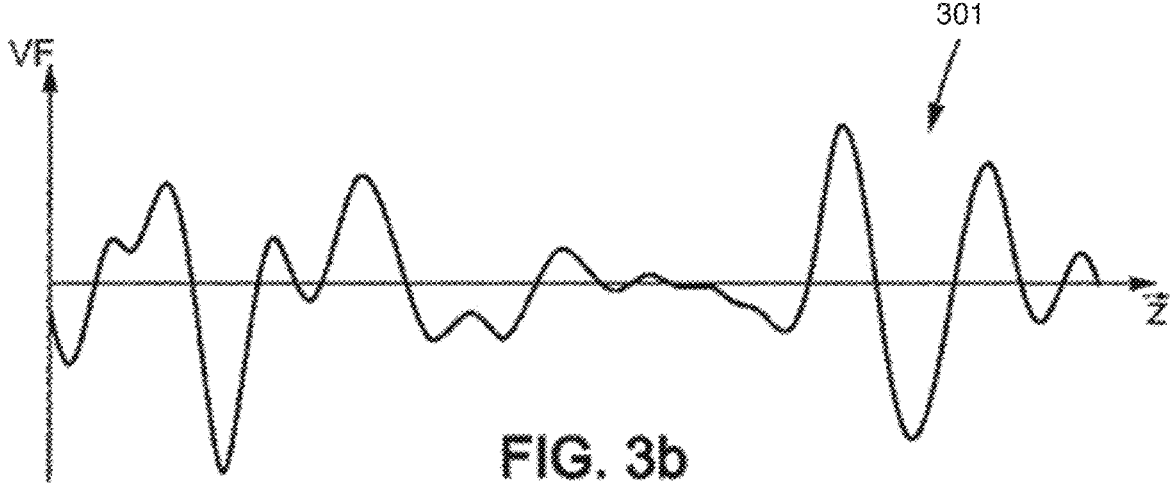
FIG. 3b illustrates an example of filtered well data in one embodiment according to the invention.

FIG. 3b illustrates an example of filtered well data. It is possible to process the raw well data received in order to obtain modified/processed data. For example, the processing may comprise a filter making it possible to only retain a fine frequency range (e.g. 90-100 Hz) or advantageously a broader frequency range (e.g. from 0 Hz to 200 Hz) including the value 0 Hz. The curve 301 represents the data derived from filtering the data of the curve 300 through a bandpass filter (e.g., having a frequency band of 10-50 Hz.

The aforementioned WO2015/067864 described an inversion method based on training a neural network and using this trained neural network to infer well data or geological information from seismic data (e.g., the trained network may be used as a seismic to well tie). The concepts disclosed therein are based on an assumption that the seismic wavelet is substantially constant (or subject to little variation) throughout the "reservoir" domain or zone (i.e. consisting of rock suitable for capturing gas or hydrocarbons). The use of the trained neural network makes it possible to ignore the seismic wavelet considered to be constant or invariant in the domain considered (i.e., a blind decomposition or deconvolution as the variation thereof is very small in this domain), as a neural network can be trained to deconvolve or remove such an invariant wavelet through training. The neural network can then use knowledge of a well (measured well log data) to enhance the resolution of the seismic acquisition in another domain of the subsoil ("generalisation").

It should be appreciated that any reference to removing the seismic wavelet by the trained neural network comprises removing only the remaining wavelet or residual wavelet which is not removed during standard seismic processing, as initial seismic processing will remove most of the wavelet.

The training of the neural network may comprise the following steps:

receiving seismic data (e.g., pre-stack seismic data) comprising at least one seismic signal derived from the emission of a seismic wavelet in a subsoil;

identifying at least one portion of each seismic signal corresponding to reflections of the seismic wavelet in a reservoir zone of said subsoil, and determining a length of the seismic wavelet (e.g., using the methods described above);

receiving well data corresponding to said identified reservoir zone; and training a neural network using training data comprising:
a plurality of sub-portions of the at least one portion as input variables, where the sub-portions each have a length dependent on the determined length of the seismic wavelet, and at least one second piece of geological information according to said well data as a target variable.

Figure 4A:
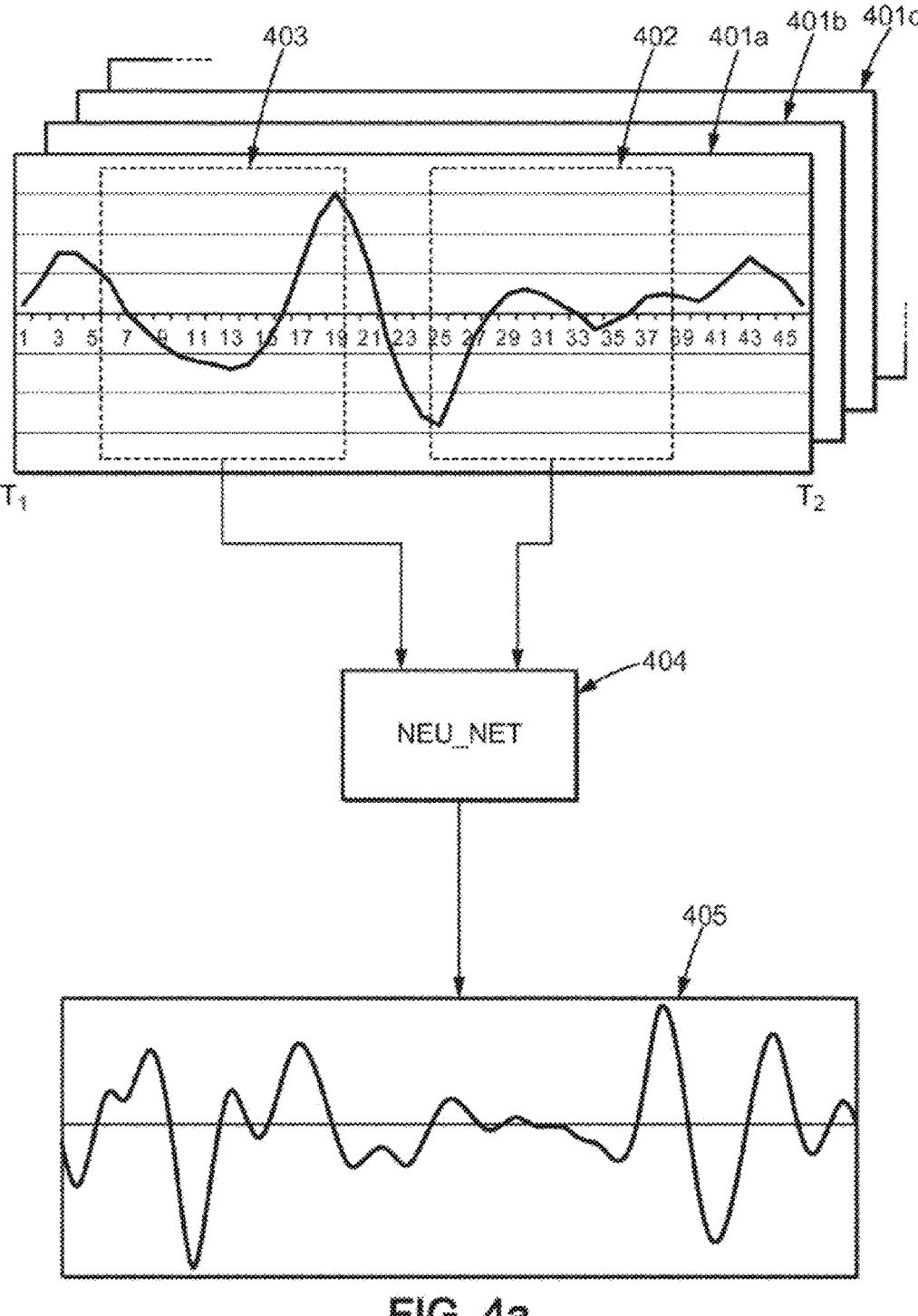
FIG. 4a illustrates training of a neural network based on seismic signal data and filtered well data in one embodiment according to the invention.

FIG. 4a illustrates this training of a neural network based on seismic signal data and filtered well data. In order to carry out training of a neural network 404 using a back propagation principle, it is useful to provide the neural network 404 with numerous examples of input values associated with one or a plurality of output values. These values are referred to as a "training set". This training is in fact "supervised" training as the correct output values (measured well data) are known for each input value (seismic data). During the training, the nodes of the neural network 404 are modified. Numerous algorithms are possible for such modifications (i.e. modification of weightings of the different nodes).

It is also possible to envisage a set of input and output values suitable for validating the neural network and/or computing the error of this network: this is referred to as the "validation set". In practice, the training set is frequently approximately two times greater than the validation set (e.g. in a 70%-30% ratio for example).

In the embodiment shown, it is possible to adopt a plurality of sub-portions (402, 403) of the pre-stack signal (401a, 401b, 401c, etc.) as input values. Obviously, if the signal is a stack signal, it is possible to work directly with this signal rather than with each of the pre-stack signals. Using pre-stack signals makes it possible to prevent of the loss of "high-frequency" information associated with the stacking of signals which are not perfectly "corrected" (e.g. "normal moveout correction"). The length of these sub-portions may be chosen to be the length of the wavelet determined previously, or slightly longer. For example, length of these sub-portions may comprise a multiple of the length of the wavelet determined previously. As such, the length of these sub-portions may be between 1 and 2 times the determined wavelet length (e.g., 1×, 1.1× or 1.5× or 2× the determined wavelet length) as the length of these sub-portions: If the sub-portion is slightly greater than the wavelet, the precision of the neural network can be greater, particularly in the event of poor evaluation of the length of the wavelet or in the event of poor well-seismic alignment, even though the convergence of the neural network during training may be slower. As such, the sub-portion length chosen may be a factor of the uncertainty on the wavelet length evaluation/or well-seismic alignment, with longer lengths chosen when uncertainty is greater.

It is possible to take a single output value for all the input values of the training set. This single output value is the processed/filtered signal 405 derived from the well data and limited to the "reservoir" domain. Training the neural network can make it possible to avoid computing complex de-convolutions as mentioned with reference to FIG. 2a. Furthermore, the neural network accounts for the entire signal received, including the "high-frequency" information previously considered as noise, to be removed from the computations.

The data returned by the neural network are of the same type as the well data used for training: e.g., if the well data used for training are pieces of reflectivity information, the neural network returns reflectivity information, etc.

Figure 4B:
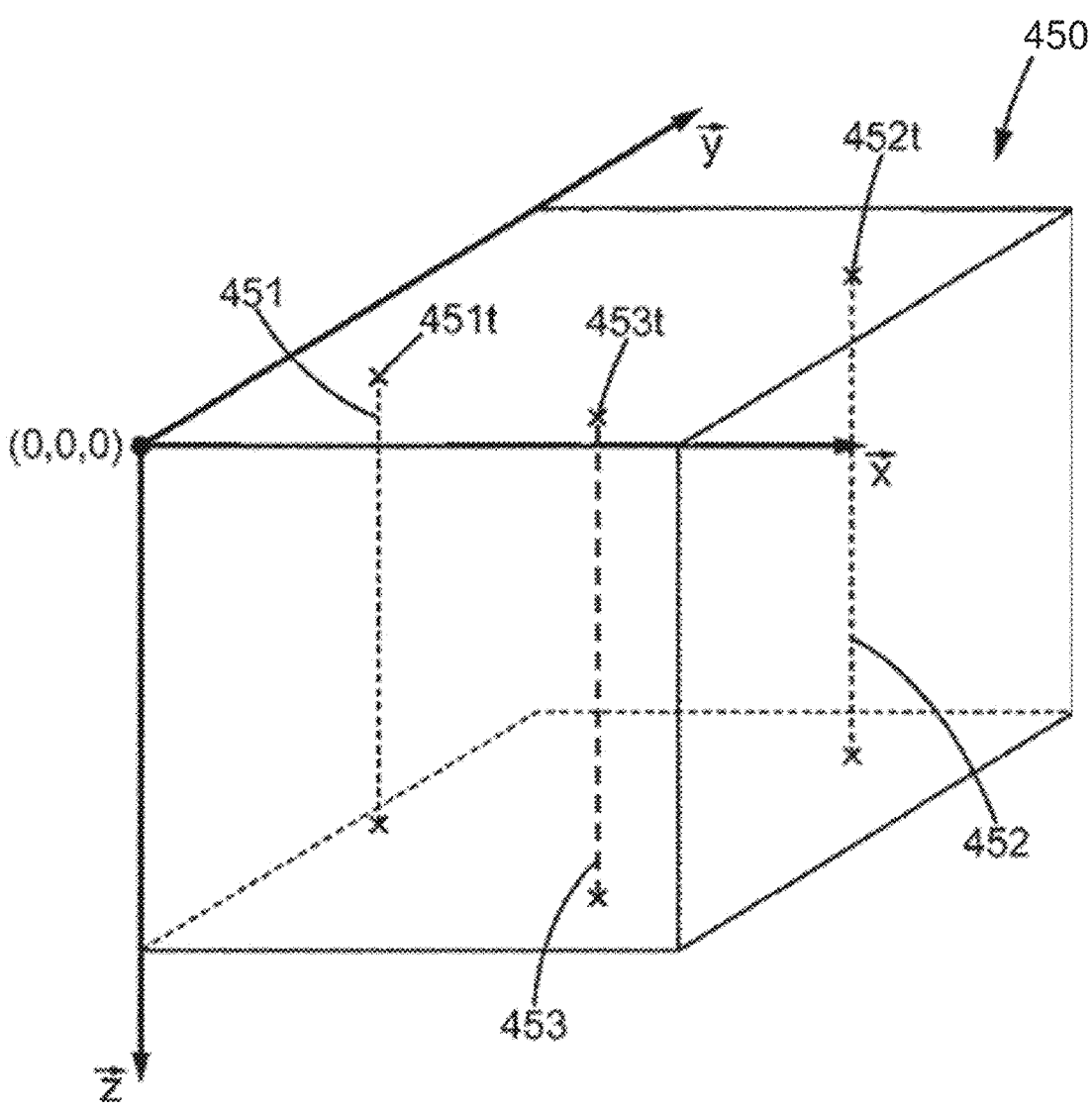
FIG. 4b illustrates a three-dimensional representation of a geological subsoil.

FIG. 4b illustrates a three-dimensional representation of a geological subsoil. In this representation 450, the well data on the wells 451 and 452 are known. It is thus possible to carry out training of the neural network 404 using, as input data, sub-portions of the pre-stack signal received at the wellhead 451 t and associated with the known well data on the well 451. It is also possible to add to these input and output data, further data obtained from other wells such as the well 452. As such, the training may be carried out using as input data:

sub-portions of the pre-stack signal received at the wellhead 451t and associated with the known well data on the well 451 (and optionally modified as described above); and sub-portions of the pre-stack signal received at the wellhead 452t and associated with the known well data on the well 452 (and optionally modified as described above).

Once the training of the neural network is complete, it is possible to have the neural network determine well data along a "virtual" well (i.e. vertical segment along $\vec{z}$ of the space $\vec{x}$, $\vec{y}$, $\vec{z}$) not actually drilled, e.g. segment 453) on the basis of the seismic signal received at the wellhead (e.g. point 453t) of this "virtual" well.

A main advantage of BNNI techniques disclosed in WO2015/067864 is that more of the seismic signal (e.g., including the high frequency information normally filtered out as noise) can be used in training the neural network and therefore can be used in inverting the seismic data using the trained neural network. While the seismic data may still be filtered to remove very high frequency content, BNNI techniques enable the retention of seismic data up to 2 to 3 times the frequency of the seismic wavelet, for example. This is a consequence of the assumption that the seismic wavelet is constant within the subsurface volume/reservoir zone. Using seismic data including all high frequency information and an assumed constant wavelet to train the neural network will mean that the neural network will learn to deconvolve the wavelet (the learning will remove the constant component) when learning to map the seismic data to the well data. This high frequency information comprises useful reservoir information.

In known BNNI techniques as disclosed in WO2015/067864, the neural network is trained on training data relating to an existing well (or wellhead) location. When drilling a new well, the result of an inversion performed using such a trained neural network may lack the desired accuracy due to the distance of this new well from the training data. This can be particularly acute when the new well being drilled is a non-vertical well; e.g., it is non-vertical or even substantially horizontal along a substantive portion of its length. With the increase in the number of slanted or horizontal wells planned on complex reservoirs, the problem of predicting the presence of sand bodies, their lateral length and connectivity in the inter-well space becomes more and more relevant.

When drilling a well, the drilling position is not always known accurately. Furthermore, new well log data (well data) becomes available as part of the drilling process. It would be desirable to use this new well data as it becomes available, in real time or near real time, to make drilling decisions and/or better monitor the drilling trajectory.

One particular advantage of BNNI techniques is that the neural network is very accurate when inverting for a region or volume close to the region on which it was trained. It is therefore proposed to supplement the training of the trained neural network in a retraining step as new well data becomes available. The retrained neural network can then be applied to seismic data to invert for a region further along the proposed drilling path, and/or regions within the vicinity of this proposed path. Based on this inversion, a drilling decision may be made, such as a change in intended trajectory or a decision as to whether to drill further or not.

When drilling a well, there will be seismic data available and corresponding or nearby well data which is logged during drilling. Therefore, learning can be improved via these new well logs. This well data can improve resolution of reservoir such that a remaining portion of the well path which is to be drilled will be viewed more clearly (better resolution) based on the teaching from previously recorded well logs from the sections already drilled.

BNNI can be performed in near real-time, including the supplemental training to incorporate the new data relating to a drilled portion (this additional training may only take minutes per portion). As such, the training and further inversion may be performed ahead of (or simultaneously with) the drilling of a new portion. In this way, an improved drilling strategy may be derived during the drilling drillers with improved solution (e.g., current drill position which has some uncertainty) when drilling remaining well path. Optimizing a drilling strategy may comprise optimizing a trajectory of the new portion.

Figure 5:
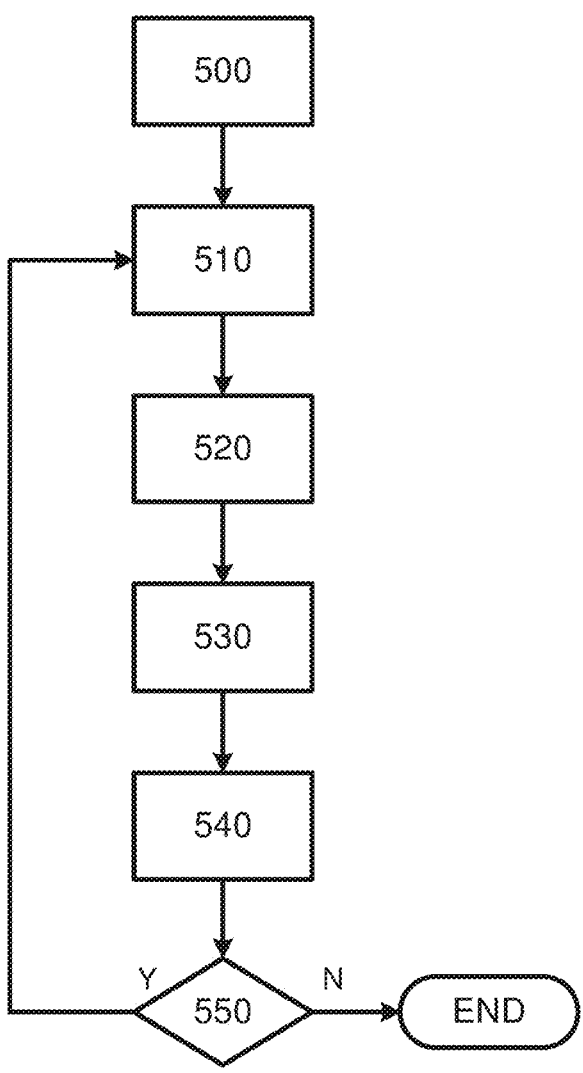
FIG. 5 is a flowchart describing an embodiment according to an embodiment.

FIG. 5 is a flowchart describing a method according to an embodiment. At step 500, a neural network is trained on well data and seismic data relating a plurality of wells within a subsurface volume comprising a reservoir zone in which a new well is to be drilled.

At step 510, drilling of a first portion of a new well is performed and well log data for the drilled portion collected (fresh or new well data). Each portion of the well path, in this context, may comprise a length smaller than 100 m, a length smaller than 75 m, a length smaller than a length smaller than 30 m, a length smaller than 20 m or a length smaller than 15 m for example. Each portion may be longer than or equal to 2 m, 5 m or 10 m for example.

At step 520, the neural network trained at step 500 is further trained with the new well data and associated seismic data recorded at the reservoir zone (e.g., in the region of the drilled well).

In an embodiment, uncertainty in the path location and/or drill position may be included in the training at this training step such that the trained neural network can correct for this uncertainty of trajectory. This may comprise including adding at each position, a region of uncertainty around the drill location defined by a volume $\Delta x^* \Delta y^* \Delta z$ around a position x,y,z associated with the corresponding seismic data. This drill position may be considered in terms of probabilities within this region (e.g., describing what is sometimes referred to as the cone of uncertainty for the drilling). The uncertainty may include the time to depth uncertainty, i.e., the geographical uncertainty in the time to depth conversion.

At step 530, an inversion is performed using the further trained neural network to predict well data for a region of interest such as a region including the intended drilling path. The result of the inversion may comprise an inversion cube/space or inversion result relating to the region of interest. Such an inversion cube may comprise a log property attribute cube (e.g., a porosity cube, gamma ray cube, etc.) for example.

At step 540, a suitable drilling action may be performed and/or strategy amended or verified based on the result. The strategy may comprise simply proceeding with the drilling according to the planned trajectory, or it may comprise altering the trajectory.

For example, the inversion result may enable prediction of main surfaces and heterogeneities along the planned well path; therefore defining the reservoir boundaries while drilling. The identification of major heterogeneities enables the planned well path to be altered to avoid such heterogeneities, and/or to better relocate an injector well with respect to a production well etc. For example, where the inversion predicts the presence of a shale layer or region, which may act as potential barrier, along the planned drilling path and its dimensions, the drilling path may be amended to avoid it. Similarly a drilling path may be amended to ensure a producing region (hydrocarbon deposits) is drilled and not missed.

Alternatively the action may comprise ceasing drilling. For example, where the well is a development well, immediate and accurate information allows drilling to be terminated as soon as sufficient productive reservoir has been drilled. Similarly, if the inversion shows nothing of interest past a particular point, then drilling may be terminated.

At step 550, it is determined whether a new portion is to be drilled (according to the strategy determined in the previous step. If so, steps 510 to 540 are repeated for each new portion, with the neural network learning iteratively as each new portion is drilled.

An optional check or validation step may be formed during one, some or all iterations of the method. This validation step may comprise comparing the inversion result (e.g., a prediction of the portion of the well to be drilled) to the actual well log data after this portion is drilled to check the discrepancy between prediction and realization.

Based on such the validation step, a corrected position for the drilling string or drill bit may be determined. Such a method may comprise altering the location (e.g., with respect to the seismic data) of the drill string/drill bit to maximize a correlation (e.g., or minimize an error metric) between the inversion cube or inversion result and the actual well log data or cube.

In summary, the methods described herein enables optimization of the well path while drilling and the avoidance of unnecessary sidetracks for geological reasons. Real-time learning and re-interpretation of seismic data can help to update and improve the accuracy of a prognosis while drilling.

The final trained neural network at the end of the drilling can be used for inversion of seismic data relating to the reservoir zone, particularly in the region of the drilled well.

As such, the method may further comprise performing inversion on seismic data using the final trained neural network, to obtain corresponding well data (i.e., to obtain data which characterises the well or other subsurface region in terms of one or more geological parameters). More specifically, the method may comprise performing a BNNI inversion using the final trained neural network on seismic data for the reservoir zone. The well data may be used to predict downhole conditions and make decisions concerning field operations. Such decisions may involve well planning, well targeting, well completions, operating levels, production rates and other operations and/or operating parameters.

Within the context of this disclosure, the terms non-vertical is necessarily specific. Non-vertical wells may comprise a substantially horizontal or slanted trajectory along a substantive portion (e.g., more than 30%, 50% or 70% or 100%) of its length. A substantially horizontal or slanted trajectory may comprise an angle within 70 degrees, within 45 degrees, within 30 degrees or within 20 degrees with respect to the x-y plane.

Figure 6:
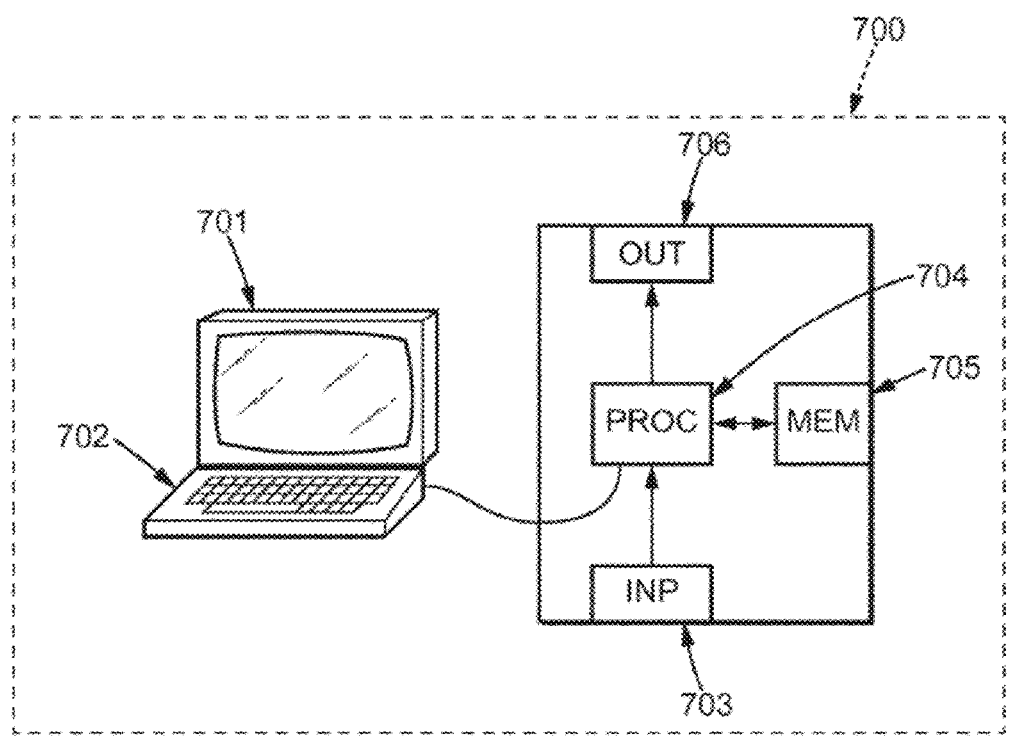
FIG. 6 is an example of a device suitable for implementing an embodiment of the invention.

FIG. 6 represents an example of a device for processing a seismic signal.

In this embodiment, the device includes a computer 700, comprising a memory 705 to store instructions for implementing the method, the measurement data received, and temporary data to carry out the various steps of the method as described above.

The computer further includes a circuit 704. This circuit can be, for example:

a processor suitable for interpreting instructions in computer program format, or an electronic card wherein the steps of any of the methods disclosed herein are described in silicon, or a programmable electronic array such as an FPGA array (Field-Programmable Gate Array).

This computer includes an input interface 703 for receiving seismic data or well data, and an output interface 706 for supplying the well data at any spatial point. Finally, the computer can include, to enable easy interaction with a user, a screen 701 and a keyboard 702. Obviously, the keyboard is optional, notably in the case of a computer in the form of a tactile tablet, for example.

Obviously, the present invention is not limited to the embodiments described above by way of examples; it applies to further alternative embodiments.

Further embodiments are possible.

The methods disclosed herein may comprise optimizing a production strategy based on the corrected trajectories and/or trained network which has been trained using said corrected trajectories. Optimizing a production strategy may comprise selecting from and/or optimizing one or more of: different well placements, different number of wells, different injection fluid pressures, different injection strategies, different injection fluids and/or drilling used. Optimizing hydrocarbon recovery may comprise selecting one or more of said different production strategies which are determined to maximize hydrocarbon production and/or minimize production costs.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for optimizing a drilling strategy during drilling of a well within a subsurface volume comprising a reservoir zone; the method comprising:
   a) obtaining a trained neural network, having been trained on first training data relating to the subsurface volume to infer well data from seismic data;
   b) obtaining fresh well data from a portion of said well which has been drilled;
   c) further training said trained neural network using second training data comprising said fresh well data and associated seismic data from the subsurface volume to obtain a further trained neural network, the second training data being different from the first training data, the further trained neural network and the trained neural network thereby providing different outputs for a same input;
   d) applying the further trained neural network to input seismic data, to determine inversion well data relating to a region of the subsurface volume comprising an intended well path for the well; and
   e) optimizing said drilling strategy for at least a next portion to be drilled based on said inversion well data.

2. A method as claimed in claim 1, comprising performing steps b) to e) for each new portion of well to be drilled.

3. A method as claimed in claim 2, comprising drilling each new portion according to the optimized drilling strategy determined at step e).

4. A method as claimed in claim 1, wherein said fresh well data comprises well data relating to an immediately preceding portion drilled.

5. A method as claimed in claim 1, wherein step e) comprises optimizing the well path trajectory for at least said next portion to be drilled.

6. A method as claimed in claim 5, wherein optimizing the well path trajectory comprises optimizing the path away from obstacles, barriers or heterogeneities within the subsurface volume and/or towards a producing region of the reservoir zone.

7. A method as claimed in claim 1, wherein step e) comprises deciding not to drill a next portion and cease drilling of the well.

8. A method as claimed in claim 1, comprising performing a validation step comprising comparing, for one or more of said portions, inversion well data determined prior to drilling a respective portion to well data obtained from drilling the same portion.

9. A method as claimed in claim 8, comprising determining a corrected position for at least a drill bit used for said drilling by determining the location for the drill bit which maximizes a correlation between said inversion well data determined prior to drilling a portion to said well data obtained from drilling the same portion.

10. A method as claimed in claim 1, wherein said seismic data comprises high frequency content up to 3 times the frequency of a seismic wavelet emitted in a subsoil to obtain said seismic data.

11. A method as claimed in claim 1, wherein said seismic data comprises pre-stack seismic data.

12. A method as claimed in claim 1, comprising an initial step of training said neural network based on said training data.

13. A method as claimed in claim 12, wherein training in steps a) and/or c) comprises:
   receiving said seismic data comprising at least one seismic signal derived from the emission of a seismic wavelet in a subsoil;

identifying at least one portion of said at least one seismic signal corresponding to reflections of the seismic wavelet in the subsurface volume;

determining a length of the seismic wavelet;

receiving well data corresponding to said identified subsurface volume;

training the neural network using:

a plurality of sub-portions of said at least one portion as input variables, said sub-portions of the portion having a length dependent on the length of the seismic wavelet determined, and at least one piece of well data, or geological information corresponding to said well data, as a target variable.

14. A method as claimed in claim 13, wherein the at least one seismic signal comprises a plurality of pre-stack seismic signals.

15. A method as claimed in claim 13, wherein the wavelet length is determined according to an autocorrelation calculation of said at least one portion.

16. A method as claimed in claim 13 wherein the length of the sub-portions is between 1 and 2 times the length of the seismic wavelet determined.

17. A method as claimed in claim 1, comprising defining a region of uncertainty in a location of a previously drilled portion and/or drill and including this region of uncertainty in the further training of step c).

18. A non-transitory data storage medium having recorded therein a computer program, the computer program comprising computer readable instructions which, when run on suitable computer apparatus, cause the computer apparatus to perform the method of claim 1.

19. A computer program carrier comprising the computer program of claim 18.

20. A processing apparatus comprising:

a processor; and the computer program carrier of claim 19.

* * * * *